US007844792B2

(12) United States Patent
Lange et al.

(10) Patent No.: US 7,844,792 B2
(45) Date of Patent: Nov. 30, 2010

(54) GAME DISK LAYOUT

(75) Inventors: Jonathan E. Lange, Bellevue, WA (US);
Jeffrey E. Simon, Sammamish, WA
(US); Jason M. Cahill, Carnation, WA
(US)

(73) Assignee: Microsoft Corporation, Redmond, WA
(US)

( * ) Notice: Subject to any disclaimer, the term of this patent is extended or adjusted under 35 U.S.C. 154(b) by 0 days.

(21) Appl. No.: 11/073,138

(22) Filed: Mar. 4, 2005

(65) Prior Publication Data
US 2005/0149586 A1 Jul. 7, 2005

Related U.S. Application Data

(63) Continuation of application No. 10/153,220, filed on May 23, 2002, now Pat. No. 6,910,116.

(51) Int. Cl.
*G06F 12/00* (2006.01)
(52) U.S. Cl. .................. 711/170; 711/171; 711/172; 711/173; 711/201; 711/112; 707/601; 707/802; 707/803; 707/805; 715/810; 715/841; 715/858; 715/866; 715/762; 715/764; 715/765; 715/788; 715/789
(58) Field of Classification Search .............. 715/810, 715/841, 858, 866, 762, 764, 765, 788, 789; 707/601, 802, 803, 805; 711/170, 171, 172, 711/173, 201, 112
See application file for complete search history.

(56) References Cited

U.S. PATENT DOCUMENTS

| | | | |
|---|---|---|---|
| 5,706,472 A | 1/1998 | Ruff et al. | 711/173 |
| 5,787,068 A | 7/1998 | Arps et al. | |
| 5,832,088 A | 11/1998 | Nakajima et al. | |
| 6,401,160 B1 * | 6/2002 | See et al. | 711/5 |

(Continued)

FOREIGN PATENT DOCUMENTS

JP        11096734 A        4/1999

(Continued)

OTHER PUBLICATIONS

Official Notice of Rejection from the Japan Patent Office regarding Japanese Patent Application No. 2008-070424 dated Feb. 9, 2010.

(Continued)

*Primary Examiner*—Tuan V Thai
*Assistant Examiner*—Midys Rojas

(57) ABSTRACT

A software tool automatically places files and folders of a software program within segments of a DVD. The segments are defined by security placeholders, and the disposition of the placeholders is initially randomly determined, consistent with predefined rules. The placeholders are included on the disc to hinder unauthorized copying. A developer generally defines the order in which the files and folders are to be laid out, and the software tool automatically places the files and folders, filling successive segments and shifting the placeholders to accommodate files that will not fit in a current segment. However, any movement of the placeholders must be done by the tool and is only permitted if the new disposition of the placeholder is in accord with the predefined rules. A user can manually modify the automated layout, and in response, the files and folders are automatically shifted to accommodate the changes introduced by the user.

19 Claims, 9 Drawing Sheets

U.S. PATENT DOCUMENTS

| | | | |
|---|---|---|---|
| 7,178,110 B2* | 2/2007 | Fujino | 715/838 |
| 2002/0069324 A1* | 6/2002 | Gerasimov et al. | 711/114 |
| 2002/0073261 A1 | 6/2002 | Kosaraju | 710/240 |
| 2002/0180803 A1* | 12/2002 | Kaplan et al. | 345/810 |
| 2003/0076764 A1 | 4/2003 | Iwano et al. | |

FOREIGN PATENT DOCUMENTS

| | | |
|---|---|---|
| WO | WO9605595 A1 | 2/1996 |
| WO | WO0163419 A1 | 8/2001 |

OTHER PUBLICATIONS

Search Report from the European Patent Office regarding Application No. 02011948.3 dated Apr. 8, 2010.

Coffman, Jr. et al., "Approximating Algorithms for Bin Packing: A Survey", Approximation Algorithms for NP-Hard Problems, PWS Publishing, Jul. 1, 1996.

* cited by examiner

FIG. 3

| Name | Folder | Size on Disk | Sector Range |
|---|---|---|---|
| Empty | | 62 KB | 1 - 31 |
| Volume Descriptor | | 4 KB | 32 - 33 |
| Empty | | 176.63 MB | 34 - 90465 |
| Security Placeholder | | 8.00 MB | 90466 - 94563 |
| Empty | | 300.65 MB | 94564 - 248495 |
| Security Placeholder | | 8.00 MB | 248496 - 252593 |
| Empty | | 445.52 MB | 252594 - 480697 |
| Security Placeholder | | 8.00 MB | 480698 - 484795 |
| Empty | | 302.18 MB | 484796 - 639509 |
| Security Placeholder | | 8.00 MB | 639510 - 643607 |
| Empty | | 586.34 MB | 643608 - 943814 |
| Security Placeholder | | 8.00 MB | 943815 - 947912 |
| Empty | | 300.70 MB | 947913 - 1101868 |
| Security Placeholder | | 8.00 MB | 1101869 - 1105966 |
| Empty | | 283.72 MB | 1105967 - 1251233 |
| Security Placeholder | | 8.00 MB | 1251234 - 1255331 |
| Empty | | 298.43 MB | 1255332 - 1408126 |
| Security Placeholder | | 8.00 MB | 1408127 - 1412224 |
| Empty | | 592.59 MB | 1412225 - 1715631 |

Layer 0: 0 files, 0 Bytes used

FIG. 5

| Name | Folder | Size on Disk | Sector Range |
|---|---|---|---|
| Security Placeholder — 184 (TYP.) | | 8.00 MB | 791326 - 795423 |
| Empty — 186 (TYP.) | | 297.37 MB | 795424 - 947677 |
| Security Placeholder | | 8.00 MB | 947678 - 951775 |
| Empty | | 290.38 MB | 951776 - 1100451 |
| Security Placeholder | | 8.00 MB | 1100452 - 1104549 |
| Empty | | 299.17 MB | 1104550 - 1257725 |
| Security Placeholder | | 8.00 MB | 1257726 - 1261823 |
| Empty | | 286.85 MB | 1261824 - 1408692 |
| Security Placeholder — 188 (TYP.) | | 8.00 MB | 1408693 - 1412790 |
| Empty | | 582.25 MB | 1412791 - 1710904 |
| sample31.bmp | .\media\textures ~190 (TYP.) | 194 KB | 1710905 - 1711001 |
| sample30.bmp | .\media\textures | 194 KB | 1711002 - 1711098 |
| sample29.bmp | .\media\textures | 194 KB | 1711099 - 1711195 |
| sample28.bmp | .\media\textures | 194 KB | 1711196 - 1711292 |
| sample25.bmp | .\media\textures | 194 KB | 1711293 - 1711389 |
| sample24.bmp | .\media\textures | 194 KB | 1711390 - 1711486 |
| sample23.bmp | .\media\textures | 194 KB | 1711487 - 1711583 |
| sample22.bmp | .\media\textures | 194 KB | 1711584 - 1711680 |
| sample21.bmp | .\media\textures | 194 KB | 1711681 - 1711777 |
| sample20.bmp | .\media\textures | 194 KB | 1711778 - 1711874 |
| sample2.bmp | .\media\textures | 194 KB | 1711875 - 1711971 |
| sample18.bmp | .\media\textures | 194 KB | 1711972 - 1712068 |
| sample17.bmp | .\media\textures | 194 KB | 1712069 - 1712165 |
| sample16.bmp | .\media\textures | 194 KB | 1712166 - 1712262 |
| sample15.bmp | .\media\textures | 194 KB | 1712263 - 1712359 |
| sample1.bmp | .\media\textures | 194 KB | 1712360 - 1712456 |
| matte.bmp | .\media\textures | 50 KB | 1712457 - 1712481 |
| Cord.bmp | .\media\textures | 194 KB | 1712482 - 1712578 |
| bezel2.bmp | .\media\textures | 194 KB | 1712579 - 1712675 |
| bezel.bmp | .\media\textures | 194 KB | 1712676 - 1712772 |
| AnalogGauge_a.bmp | .\media\textures | 98 KB | 1712773 - 1712821 |
| <textures> | .\media | 2 KB | 1712822 - 1712822 |
| AnalogGauge.bmp | .\media\textures | 98 KB | 1712823 - 1712871 |
| Test1.ini | .\media\muprod | 2 KB | 1712872 - 1712872 |
| <muprod> | .\media | 2 KB | 1712873 - 1712873 |
| MUPROD.INI | .\media\muprod | 2 KB | 1712874 - 1712874 |
| GamepadS.xbg | .\media\models | 1.27 MB | 1712875 - 1713524 |
| <models> | .\media | 2 KB | 1713525 - 1713525 |
| Gamepad.xbg | .\media\models | 862 KB | 1713526 - 1713956 |
| Arial_16.tga | .\media\fonts | 130 KB | 1713957 - 1714021 |
| Arial_16.abc | .\media\fonts | 4 KB | 1714022 - 1714023 |

Layer 0: 54 files, 9.23 MB used

*FIG. 6*

GAME DISK LAYOUT

RELATED APPLICATION

This application is a continuation of prior co-pending patent application Ser. No. 10/153,220, filed on May 23, 2002, the benefit of the filing date of which is hereby claimed under 35 U.S.C. §120.

FIELD OF THE INVENTION

The present invention generally relates to laying out the storage of files on a storage medium, such as an optically encoded disc, and more specifically, pertains to a tool, system, and method for laying out files in successive segments on the storage medium that are separated by movable placeholders, where the placeholders are included to hinder unauthorized copying of the disc and their positions on the storage medium are constrained by predefined rules.

BACKGROUND OF THE INVENTION

Software products are currently typically distributed to end users on optically encoded discs, such as compact disc-read only memory (CD-ROM) discs or digital versatile discs (DVDs). Because of the complexity of some software products and the number of routines, objects, components, functions, data structures, modules, and libraries included with the product, it is not uncommon for the products to require from several hundred megabytes (MB) to several gigabytes (GB) of total storage on the distribution discs. Electronic games, which often include complex graphic files and sound libraries, may require both layers on a DVD to store all of the files on a single disc.

The placement of files on a storage medium can sometime affect the efficiency with which the files are read from the drive. On DVDs, data are encoded such that each data block is the same linear size. Since the circumference of a single data track is longer nearer the outer edge of the disc, more data are recorded nearer the outer edge per track or rotation than nearer the inner portion. Drives of the constant linear velocity type (CLV) rotate more slowly as data are read from tracks closer to the outer edge, and speed up to read data from tracks nearer the inner portion of the disc. In contrast, on drives of the constant angular velocity (CAV) type, files placed nearer the outer edge of a DVD are read faster than those placed nearer the center. So, if read with a drive of the CAV type, to most efficiently load the files of a game or other software program from a disc into random access memory (RAM), a developer will preferably order the files as they are stored on the disc so that those files that must be loaded first to initiate display of a start screen and other frequently accessed files are stored closest to the outer edge of the disc. Also, files that are sequentially loaded into memory are preferably placed close together to minimize the seek time of the disc drive to access and read the files. The developer can list the files in the order that they should preferably be stored on the disc, from the outermost edge toward the center, to achieve the most efficient access of files needed during loading and execution of the software product A growing problem faced by companies that distribute and license software on CD-ROMs or DVDs is the ease with which such software can be duplicated for resale in violation of the copyright in the product. Various techniques have been developed to reduce the risk of copying such discs. Game software distributed on discs that are used on a game console is particularly at risk of being copied. One technique that has been developed to prevent copying uses security placeholders that divide a DVD into a plurality of segments. The security placeholders are written onto the discs in a manner that is difficult to duplicate using conventional disc copying techniques. For example, DVD software discs used with Microsoft Corporation's X-BOX™ game console employ a security format that uses eight placeholders to divide each layer of a dual layer DVD into nine segments in which files may be stored. The placeholders are positioned on the DVD according to predefined rules and a pseudo random variable is applied to slightly change the position of the placeholders relative to their initial position determined by these predefined rules. Files stored on a secure disc produced using this format must be placed in the available 3.2 GB of storage per layer provided in the 18 segments defined by the placeholders. The sizes of the segments are not fixed, but instead, typically vary from one DVD to another. Although the placeholders can be moved from their initial position, any change in position must be done in an automated manner, in accord with the predefined rules, which are not made known to a developer.

Manually laying out the storage of files on a secure DVD format that uses placeholders to divide a disc into segments, so that the files are arranged in a desired order, can be a time consuming and relatively inefficient task, since the user cannot manually move the placeholders to fit files into segments. Accordingly, it would be preferable to automate the layout of the files on such a disc by providing a software tool for automatically laying out the files of a software product within the segments of a secure disc. The tool should enable a user to add, delete, and move files within the segments on the secure disc using a file management program, and should then adjust the disposition of the files in the layout by segments accordingly.

SUMMARY OF THE INVENTION

As noted above, a secure disc format employs security placeholders to divide a storage medium, such as a DVD optically encoded disc, into segments of varying size. Predefined rules, which are not known to the user who must layout files for storage on the disc, determine generally where the placeholders are disposed on a disc and randomize the position of the placeholders within limits defined by the predefined rules. Different DVD discs using this secure format will thus typically have placeholders positioned in different locations, because of the variations in the selection of disposition of the placeholders when creating the format of the disc and because of the random variation in the disposition of the placeholders. A user is enabled to generally specify the order in which a collection of folders and files should preferably be laid out on the disc so as to place the folders and files that must be loaded faster closer to the outer edge of the disc (if read with a CAV drive), and to group files that are loaded sequentially into memory for execution.

An automated software tool begins placing the folders and files of the collection into the segments, filling a segment with the folders and files until a folder or file will not fit in the remaining available space of the segment. The software tool then tries to move the placeholder that is between the current segment and the next segment so as to efficiently fit the folder or file into one of these two segments. For example, the software can either move the placeholder against the last folder or file that was positioned in the current segment, and place the folder or file that is currently being placed into the next segment, or the software tool can move the placeholder to increase the available space and place the file or folder being placed in the enlarged available space of the current segment. However, any movement of a placeholder must be done automatically by the software tool in accord with the predefined rules that determine where placeholders can be positioned. If the folder or file being placed will not fit in the current segment, even if the placeholder is moved in this manner, or if the placeholder cannot be moved against the last folder or file that was placed without violating the predefined rules, an attempt is made to place the folder or file in the next segment, which may leave an empty space or gap between the last folder or file placed in the current segment and the placeholder. An attempt is then made to place the folder or file in the next segment, employing the same method as in was done in the current segment, until either a successful placement is achieved, or the end of the last layer is reached. If the folder or file cannot successfully be placed by this automated approach, it is moved to an unplaced file storage.

The placement of folders and files on the disc preferably fills successive segments from the outermost segment towards the innermost segment. If any folders or files remain after filling one layer of the storage medium, successive segments on another layer are filled until all of the folders and files have been processed. Again, any folders and files that are not successfully placed in a segment are temporarily put in an unplaced file storage. The user is then enabled to manually place folders and files from the unplaced file storage into the segments. Also, the user can add, delete, and move files within the segments, using a conventional file management program. When changes to the layout are manually made by the user, the software tool attempts to shift the files in the layout after the point where the change occurred in response to the change.

One embodiment of the invention attempts to backfill any empty space or gap in a segment, after folders or files have been placed in the next segment. Another embodiment simply leaves the empty space or gap in a segment unfilled. One embodiment tries to move a placeholder in a direction so that the placeholder is closest to its original position. Another embodiment tries to move the placeholder so as to minimize empty space in the current segment.

The software tool enables a user to view the folders and files placed in each segment in a layout view. The layout view indicates the segments in which the files have been automatically or manually placed. Files can also be grouped together and the group moved or deleted as if it were a single file. However, grouped files cannot be placed so that they extend across a placeholder and files cannot be deleted from or added to a group without first ungrouping the files. An indicator is provided to suggest a relative speed with which files can be loaded into memory as a function of their placement on a layer. A tree view displays a folder hierarchical view of the files in the collection.

Another aspect of the present invention is directed to a system for automatically laying out files for storage on a storage medium having a plurality of segments. The system includes a memory in which a plurality of machine instructions are stored, a display on which a plurality of files and the plurality of segments are indicated, along with a disposition of each of a plurality of placeholders that separate adjacent segments on the storage medium, a user input device, and a processor that is coupled to the memory, the display, and the user input device. The processor executes the machine instructions stored in the memory to carry out a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3 is an exemplary folder tree view of a collection of files to be laid out in the segments of a disc;

FIG. 5 illustrates an exemplary layout view, showing the sizes of the segments on a disc prior to movement of the placeholders and prior to placing any files in the segments;

FIG. 6 illustrates an exemplary layout view after files have been placed in some segments of layer zero on a DVD;

DESCRIPTION OF THE PREFERRED EMBODIMENT

Exemplary System for Implementing the Present Invention

Figure 1:
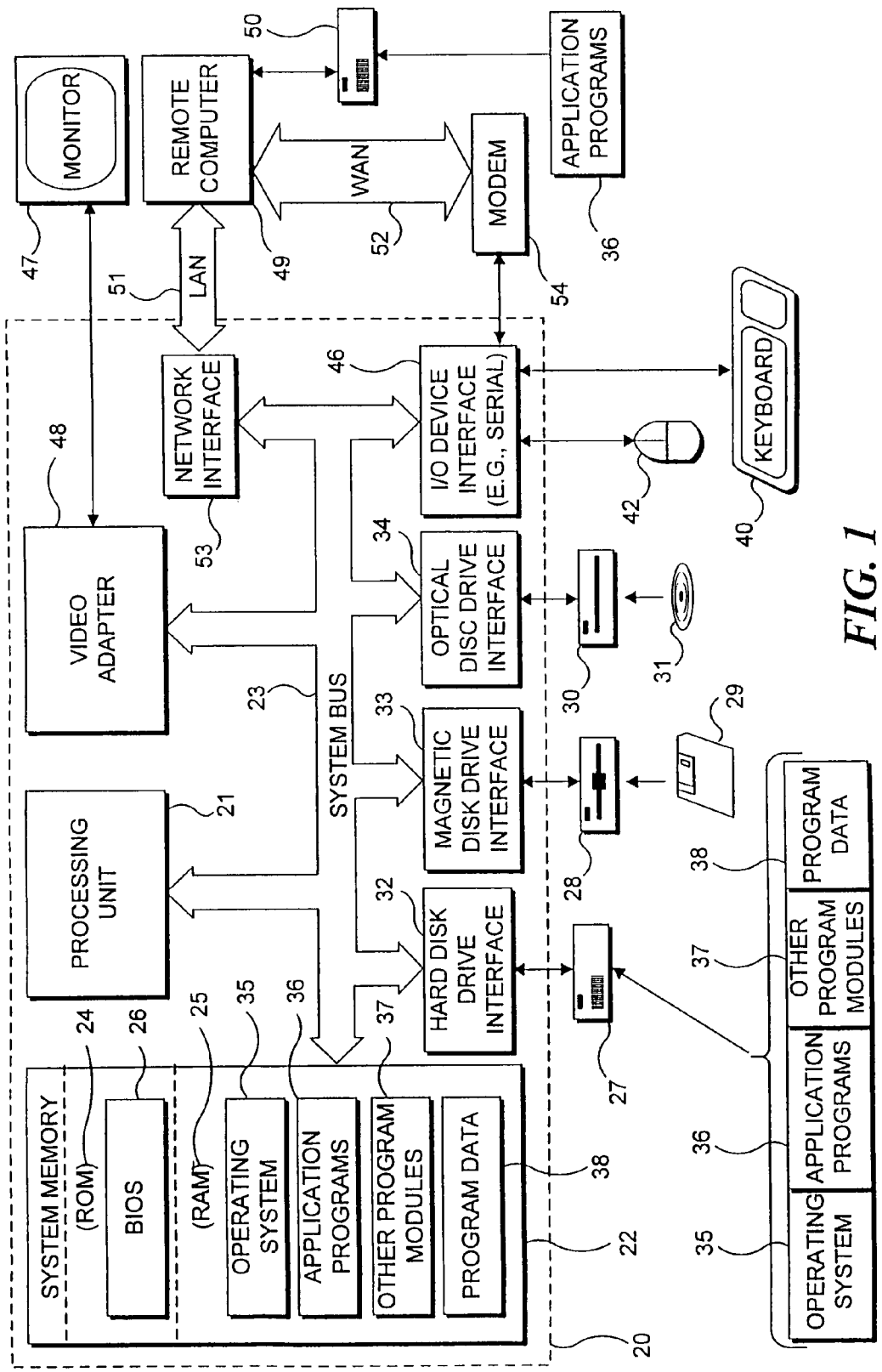
FIG. 1 is a functional block diagram of a general purpose computing device, such as a personal computer or server, that is suitable for practicing the present invention.

FIG. 1 and the following discussion related thereto are intended to provide a brief, general description of a suitable computing environment in which the present invention may be implemented. This invention is preferably practiced using one or more computing devices that typically include the functional components shown in FIG. 1. Although not required, the present invention is described as employing computer executable instructions, such as program modules that are executed by a processing device. Generally, program modules include application programs, routines, objects, components, functions, data structures, etc. that perform particular tasks or implement particular abstract data types. Also, those skilled in the art will appreciate that this invention might conceivably be practiced with other computer system configurations, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like.

With reference to FIG. 1, an exemplary system for implementing the present invention (corresponding to the server or client) includes a general purpose computing device in the form of a personal computer 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within computer 20, such as during start up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer readable media provide nonvolatile storage of computer readable machine instructions, data structures, program modules, the image files, and other data for personal computer 20. Although the exemplary environment described herein employs a hard disk, removable magnetic disk 29, and removable optical disc 31, it will be appreciated by those skilled in the art that other types of computer readable media, which can store the images files and other data that are accessible by a computer, such as magnetic cassettes, flash memory cards, digital video discs (DVDs), Bernoulli cartridges, RAMs, ROMs, and the like, may also be used in the exemplary operating environment.

A number of program modules may be stored on the hard disk, magnetic disk 29, optical disc 31, or in ROM 24 or RAM 25, including an operating system 35, one or more application programs 36, other program modules 37, and program data 38. A user may enter commands and information into personal computer 20 through input devices such as a keyboard 40, graphics pad, and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port, a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, Web pages, the original and decompressed image files, and/or other information. In addition to the monitor, the server may be coupled to other peripheral output devices (not shown), such as speakers (through a sound card or other audio interface, not separately shown), and printers.

Personal computer 20 may be included in a networked environment using logical connections to connect it to one or more other computers, such as a remote computer 49. Remote computer 49 may be a server, a router, a network PC, a peer device, or a satellite or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are well known and are common in offices, enterprise wide computer networks, intranets, and the Internet.

When used in a LAN networking environment, personal computer 20 is connected to LAN 51 through a network interface or adapter 53. When used in a WAN networking environment, personal computer 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46; i.e., through a serial port. In a networked environment, data, and program modules depicted relative to personal computer 20, or portions thereof, may be stored in the remote memory storage device. It will be appreciated that the network connections shown are exemplary and other means of establishing a communications link between the computers may be used, such as wireless communication and wideband network links.

Overview of the Present Invention

As explained above, most software developers will have a preferred order for distributing folders and files on an optically encoded disc, such as a DVD. The order is determined by several factors, including the rate at which a file loads based upon its relative radial position on the disc. As noted above, files placed closer to the outer edge of a DVD are read into memory for execution relatively faster using a CAV type drive than those files that are closer to the inner portion of the DVD. In addition, files that must be loaded sequentially into memory for execution are preferably grouped together on a disc to minimize delays caused by the read head of the DVD drive moving between disparate locations on the disc where the files might otherwise be stored. Also, it is much more efficient to access files that are loaded sequentially on the same layer, since there is a longer delay as the read head of a drive transitions between layers. Accordingly, a developer will want to order the folders and files for storage on a DVD or other storage medium used as a master to produce the discs on which a software product is distributed to end users. The present invention does not automate the process of determining the appropriate order of the files, but instead, leaves that determination to the developer or other person responsible for the file layout of the software product.

If a conventional DVD were used to store a folder structure in which the folders and files were placed in a desired order, there would be little need to automate the process of laying the files on the disc. However, the present invention automates the layout of folders and files within a secure DVD in which eight security placeholders are randomly disposed at different positions on the disc in accord with certain predefined rules. These eight security placeholders divide each layer of the disc into various size segments, leaving about 3.2 GB of storage space per layer available for storing the files of the software product. The creation of a disc formatted in conformance with the security requirements is carried out by the software tool when a new authoring session is initiated. The initial disposition of the placeholders on a new empty layout format is determined automatically by applying the predefined rules without any interaction from a developer or other user, since the predefined rules are intentionally not disclosed to the developer of the software product.

Figure 7:
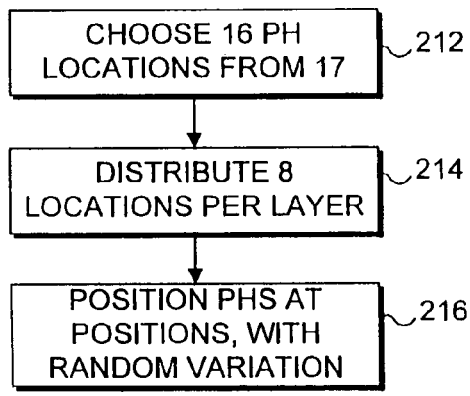
FIG. 7 is a flow chart showing the steps for defining the segments on a DVD by placing secure placeholders on the disc.

The steps involved in the creation of the format of a secure disc on which the folders and files are to be laid out are illustrated in FIG. 7. In a step 212, the software selects 16 placeholder locations from 17 possible locations, using eight security placeholders for layer zero and eight security placeholders for layer one. Layer zero is the top layer of a DVD in terms of relative depth, and layer one is disposed below layer zero. In a step 214, the placeholders on each layer are disposed at the nominal locations determined by the predefined rules. However, as indicated in a step 216, the positions of each placeholder are modified by introducing a random variation. The random variation applied to each placeholder is within limits determined by the predefined rules and is actually a pseudo-random value (i.e., based upon a seed number). Thus, the positions of the placeholders provided in each authoring session will typically be different, due to these random variations, and due to the arbitrary selection of the 16 locations for the placeholders from the 17 possible positions.

The predefined rules require that a placeholder on layer zero does not overlap a placeholder on layer one. The inclusion of the security placeholders on the discs that are distributed to end users make it relatively difficult to copy a disc using conventional copying techniques. By varying the position of the placeholders from one software product to another, the rules that define the disposition of the placeholders cannot readily be discovered. Further details concerning these predefined rules need not be discussed herein, since the rules are not pertinent to the present invention and are not required to carry out the invention. It is important to understand that the user is not permitted or enabled to manually reposition a security placeholder at any time. Any change in the position of the placeholder is accomplished by the software tool constrained by the predefined rules.

Figure 8:
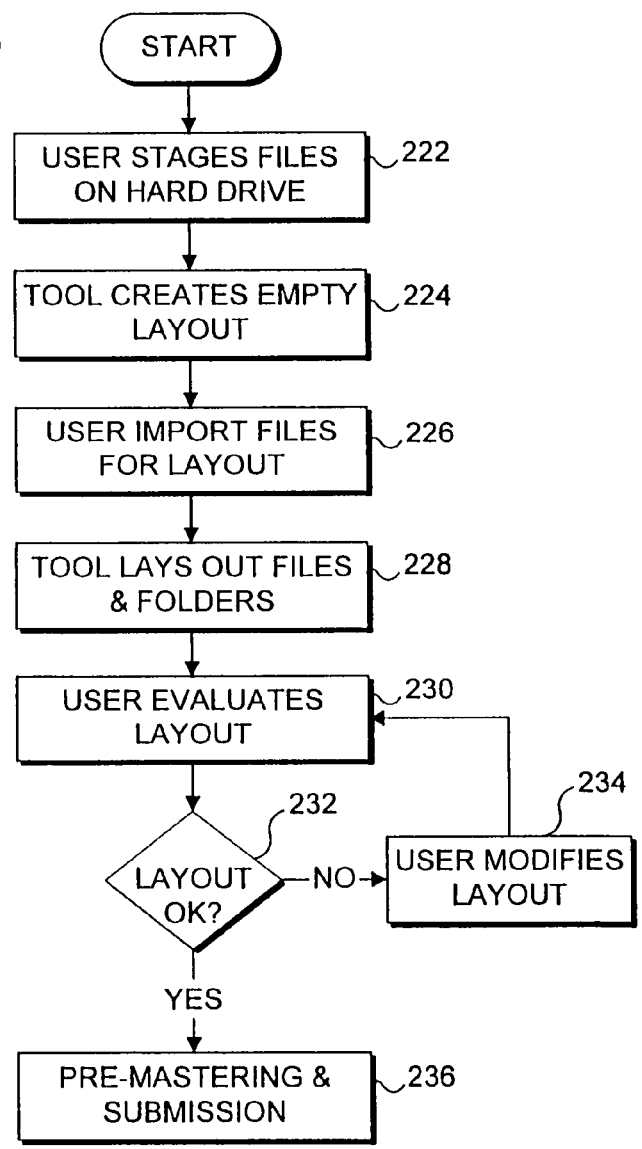
FIG. 8 is a flow chart showing the steps for automatically determining the layout of folders and files on a securely formatted DVD.

FIG. 8 illustrates the overall steps employed in the present invention for laying out files on a storage medium. After a start block, a step 222 provides that the user stages the files on the hard drive. This step involves selecting the files that are to be included within a collection of files that will be laid out on the storage medium within segments defined by the placeholders. Before a user can employ the present invention, a staging area must be defined on a hard drive or other storage accessible through the personal computer executing the software tool comprising the present invention. The staging area is a folder that contains all of the files and sub folders that the user wants to be on the disc after it is laid out with the software tool. An arbitrary number of files and subfolders can be contained within the folder designated by the user as the staging area, and these files and subfolders should be laid out in the same structure that the user desires on the final layout for the storage medium. Any movement, copying, renaming, or deleting of a file in regard to the staging area must be performed using a file management facility of the operating system, e.g., Microsoft Corporation's WINDOWS operating system EXPLORER™ program. The software tool comprising the present invention is only able to assist a developer or other user in selecting the folders and files that are to be placed on the storage medium and to automatically layout the folders and files within the segments of that medium.

In a step 224, the user creates an empty layout corresponding to the storage medium disc security format before any of the files or folders designated by the user for the file collection are placed by the software tool. FIG. 5 illustrates an exemplary empty secure layout 170 in a layout view provided by the present invention. As shown therein, a plurality of vertical columns include a name column 172, a folder column 174, a size column 176, and a sector range column 178. Since this layout does not yet contain any folders or files from the file collection, the status line on the lower portion of the layout view indicates that in layer zero, there are zero files and zero bytes of file storage. In name column 172, an initial empty segment 180 having a size of 62 KB (in this example) occupies sectors 1 through 31. This empty segment is followed by a volume descriptor 182 (but only on layer zero) having a size of four KB and occupying sectors 32 through 33. Thereafter, empty segments 184 alternate with security placeholders 186. It will be evident from studying this example that the empty segments are of different sizes. If a user were to start a new authoring session using the software tool, the sizes of the empty segments and the locations of the security placeholders would typically be different than shown in the example of FIG. 5.

Referring again to FIG. 8, in a step 226, the user imports the collection of files into the layout that was created by the software tool. This step causes the software tool to begin laying out the files and folders within successive segments of the storage medium created in step 224, as indicated in a step 228. Details of step 228 are explained below.

After the software tool completes the initial layout of the files and folders, the user will typically evaluate the layout to determine if it is acceptable. In this step, the user can change the order of the files, back fill any empty spaces in segments, and manually place any files that could not be placed by the automated technique of the software tool. A decision step 232 enables the user to indicate whether the layout is okay. If not, in a step 234, the user is able to modify the layout by repositioning files within segments using the file manager program. In addition, the user can delete or add files to segments within the layout with the file manager program, which will cause software tool to shift the files beyond the point where the change made by the user occurred. Once the layout is okay, step 236 provides for pre-mastering the layout to a desired format, for submission to a certification process, or for some other purpose. For example, the layout could be pre-mastered to a blank magnetic tape or for electronic submission to a certification authority or to some other entity.

Details for Automatically Placing Folders & Files in Layout

Figure 9:
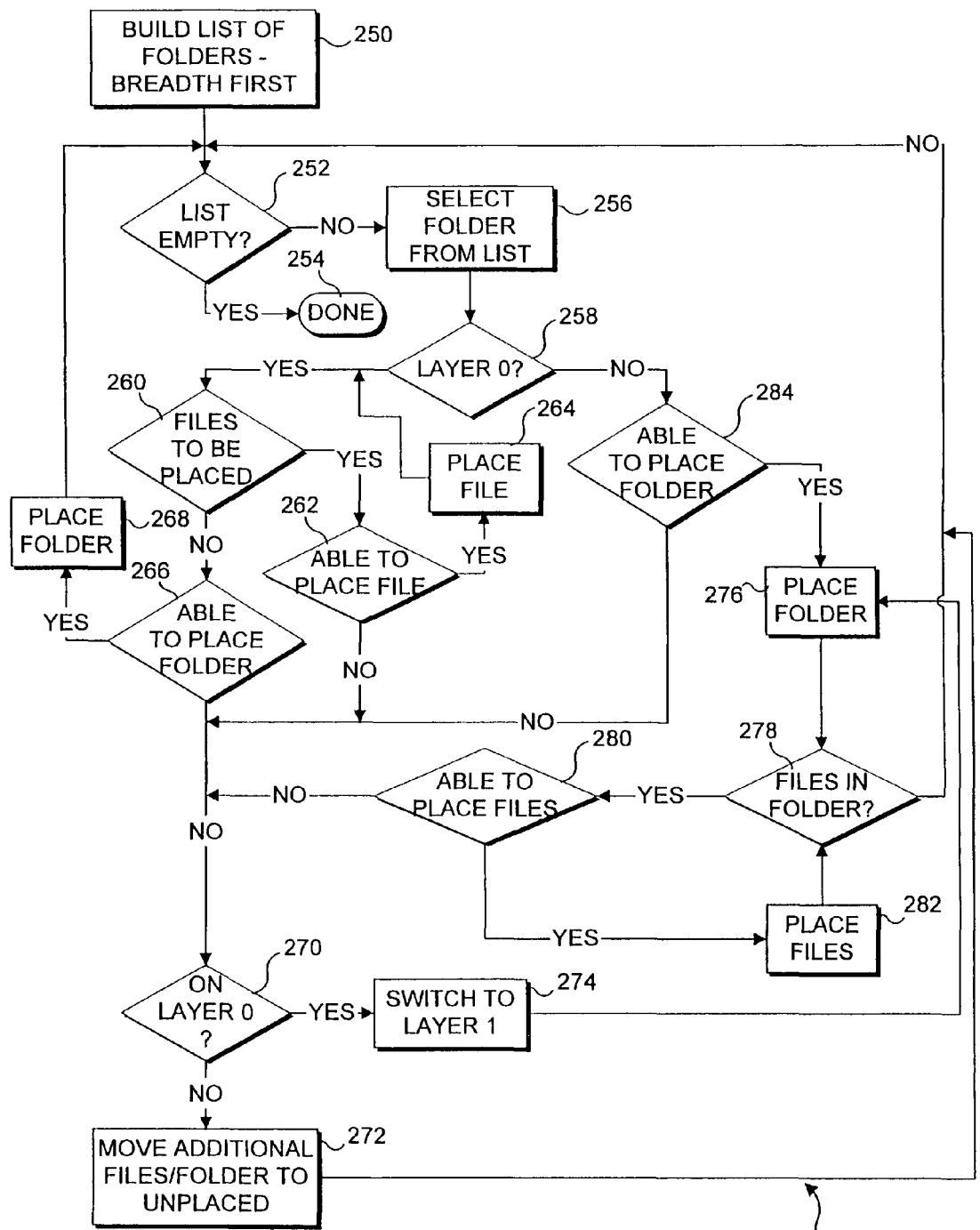
FIG. 9 is a flow chart illustrating the logic for placing folders and files in segments of the DVD.

FIG. 9 illustrates logical steps 228 that are carried out by the software tool to layout the folders and files in a collection that has been imported for layout in a storage medium. In a step 250, the software tool builds a list of folders ordered by breadth. In other words, the list includes all folders and files at a given level first, followed by all folders and files in a next lower level, followed by all folders and files in a still lower level, etc. A decision step 252 determines if the list is empty to detect when all the folders and files in the list or collection have been processed. If so, the processing is completed in a step 254. Conversely, if the list is not empty, a step 256 provides for selecting a folder from the list; since there will always at least be a root folder, the root folder will be the first folder processed. A decision step 258 then determines if the current layer of the storage medium disc is layer zero, and if so, a decision step 260 determines if there are files within the current folder to be placed on the storage medium. If so, a decision step 262 determines if it is possible to place the file within either the current segment or in any next segment on the current layer. If so, a step 264 provides for placing the file (as explained in greater detail below). Thereafter, the logic proceeds back to decision step 260 to determine if there are any more files in the current folder to be placed in the storage medium.

Once all the files in the current folder have been placed, the logic proceeds with a decision step 266 that determines if the current folder can be placed in a segment on the current layer. If so, a step 268 provides for placing the folder in one of the segments. The logic then returns to decision step 252 to determine if the list of folders and files is empty.

If it was not possible to place the folder within a segment on the current layer, the logic proceeds to a decision step 270. This step determines if the layer currently being filled is layer zero. This same decision step is reached if it was not possible to place the file in any of the segments on the current layer in decision step 262. If either the current file being processed or the current folder cannot be placed in either layer zero or layer one, the file or folder is moved to an unplaced storage, which at least temporarily stores such unplaced file or folder until a user can manually determine how best to deal with fitting the file or folder into the space available on the storage medium. Following step 272, the logic is done, since there should be no further folders or files to place automatically.

If the current layer in decision step 270 is layer zero, the logic then proceeds to a step 274, which switches to layer one for placement of the current file or folder. Next, a step 276 provides for placing the current folder in a segment on layer one. A decision step 278 determines if there are any files in the current folder that have just been placed and if so, decision step 280 determines if it is possible to place a current file from the folder in a segment on layer one. If so, a step 282 places the file accordingly. The logic then returns to decision step 278 to determine if there are any further files in the folder to be placed.

If it was not possible to place the file on layer one in decision step 280, the logic returns to decision step 270, and as a result of the determination that the logic is on layer one, proceeds to step 272 to move the file that could not be placed into the unplaced temporary storage.

In decision step 278, if there are no files in the folder, the logic returns back to decision step 252. Assuming that there is a further folder in the list, the logic would proceed through step 256 to select the folder from the list and in a decision step 258, would determine that files are currently being placed on layer one which would lead to a decision step 284. This decision step determines if it is possible to place the current folder on layer one. If so, the logic again advances to step 276 to place the folder. Conversely, if the folder cannot be placed in a segment on layer one, the logic ultimately proceeds through decision step 270 to step 272, to at least temporarily place the folder in the unplaced temporary storage.

Details for Placing Files (and Folders) in Segments of Storage Medium

Figure 10:
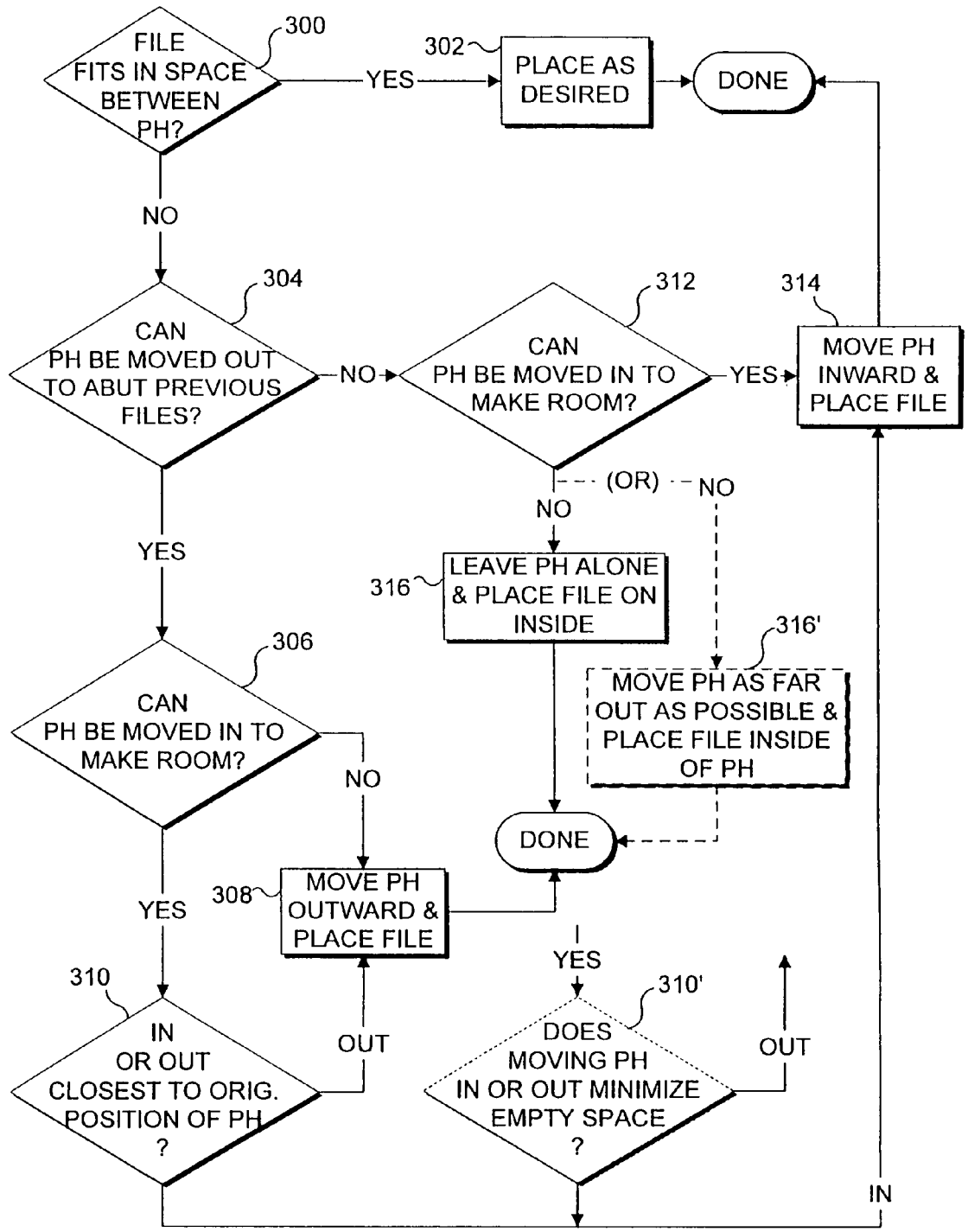
FIG. 10 is a flow chart showing the steps for moving a placeholder to accommodate a file.

FIG. 10 illustrates details regarding the steps employed when placing files in the segments of a storage medium in accord with the present invention. To simplify the flow chart in FIG. 10, only files are mentioned; however, the logic disclosed therein applies equally to placing folders in segments. A decision step 300 determines if a file that is being placed will fit in an available space in a current segment that is being filled with folders and files. Segments are defined by the disposition of placeholders, as explained above. The available space would be between either an inner or outer limit of the storage medium layer and a placeholder, or between two successive placeholders. If the file will fit within the current segment being filled, a step 302 simply places the file within the current segment, immediately after the file that was placed just previously. Thereafter, the process of placing the current file is completed, and the logic returns to the steps in FIG. 9. However, if a file currently being placed will not fit in the available space of the current segment, a decision step 304 determines if the placeholder that defines the remaining available space can be moved outwardly to abut against the files that were previously placed.

Figure 2A:
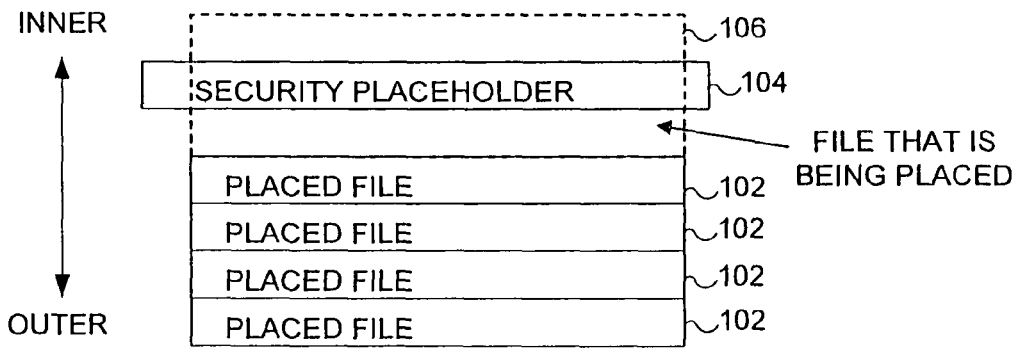
FIG. 2A is a schematic diagram illustrating a file that is being placed, but which will not fit within an available space within a current segment.

FIGS. 2A through 2D illustrate various aspects of the steps involved in placing a file in segments of a storage medium 100. In FIG. 2A, storage medium 100 includes files 102 that have already been placed within the current segment. A security placeholder 104 is disposed in the position determined by the predefined rules when the secure storage medium was initially created at the beginning of an authoring session. A file 106 is currently being placed, but as is apparent in FIG. 2A, insufficient available space remains between the files that were already placed in the current segment and security placeholder 104. The file that is being placed is denoted by the dashed lines, and its size is sufficient so that it would extend into and across security placeholder 104 if simply added after files 102, which is not permitted.

Figure 2B:
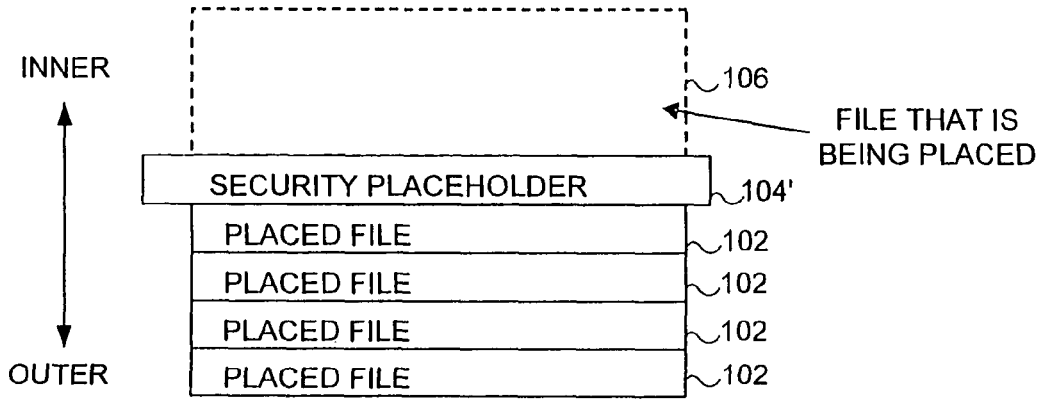
FIG. 2B is a schematic diagram illustrating movement of a security placeholder against the last file placed in the current segment, to enable the file being placed to fit within the next segment.

FIG. 2B shows a security placeholder 104' that has been moved downwardly against files 102 that were previously placed in the current segment, to enable file 106 to be positioned on the other side of the security placeholder within the next segment. Thus, FIG. 2B illustrates the movement of the placeholder that is contemplated by decision step 304 in FIG. 10. However, any movement of the security placeholder must be in conformance with the predefined rules that determine the disposition of the security placeholders in the storage medium. Accordingly, decision step 304 can only be answered in the affirmative if the movement of the security placeholder 104' to abut against files 102 leaves the security placeholder disposed in a position that does not conflict with the predefined rules that control the positions of the security placeholders.

Figure 2C:
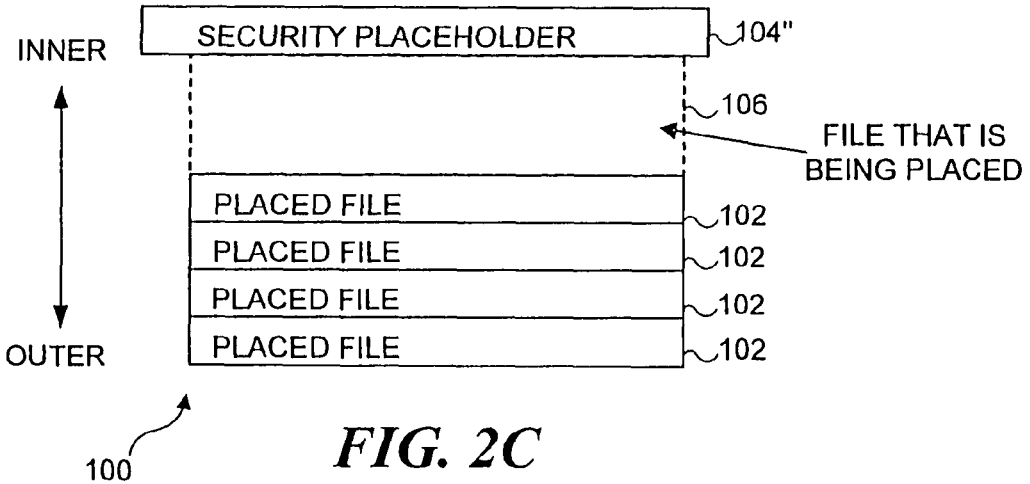
FIG. 2C is a schematic diagram illustrating movement of a security placeholder to increase the available space of the current segment so that the file being placed fits within the current segment.

If the determination in decision step 304 is affirmative, a decision step 306 in FIG. 10 determines if the security placeholder can be moved inwardly, generally as shown by security placeholder 104" in FIG. 2C, to make room for the file that is currently being placed so that the file fits within the current segment, abutting against files 102 that were previously placed therein. Again, this determination can only be answered in the affirmative if the new position of security placeholder 104" conforms to the predefined rules that determine the possible dispositions of each security placeholder.

Assuming that the response to decision step 306 is in the negative, the security placeholder is moved outwardly to abut against files 102, and the current file is placed in the next segment, as shown in FIG. 2B and as indicated in a step 308 in FIG. 10. The logic is then completed for the current file being processed.

In some cases, it is possible to move a placeholder either in or out to provide the required space for placing the current file. If so, a decision step 310 determines if the new disposition of the security placeholder, i.e., 104' or 104", is closer to the original position of the placeholder, i.e., the disposition of placeholder 104. Said another way, this step determines in which direction, either inwardly or outwardly, the security placeholder must be moved to minimize the amount of displacement from the original position of the placeholder from when the disc format was created. If the new position to which the security placeholder was moved outwardly, i.e., placeholder 104', is closer to the original position, the logic then proceeds to step 308. Conversely, if the disposition of placeholder 104" as shown in FIG. 2C is closer to its original position, then the logic proceeds to a step 314. In this step, the placeholder is moved inwardly and the file is placed between the new position of the security placeholder 104" and the files previously placed in the current segment. The processing of the current file or folder is then completed, after either step 308 or step 314.

Referring back to decision step 304, if the placeholder cannot be moved out to abut the previous files placed in the current segment, a decision step 312 determines if the placeholder can be moved inwardly to make room. Again, this type of adjustment of the placeholder is shown in FIG. 2C. It is only if the security placeholder can be moved inwardly to a position that conforms to the predefined rules for disposition of security placeholders that this decision step will be answered in the affirmative. If so, the logic proceeds to step 314, and after the placeholder is moved and the file is placed, the logic of this flow chart is done for the current file.

Figure 2D:
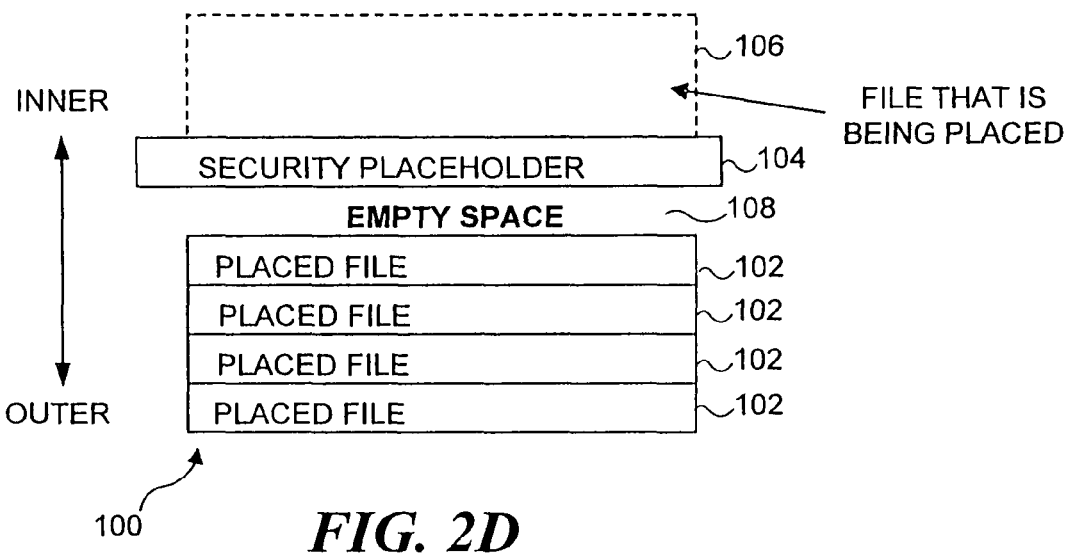
FIG. 2D is a schematic diagram illustrating placement of the file in the next segment without moving the security placeholder.

If the determination in decision step 312 is negative, a step 316 provides for leaving the placeholder unmoved and placing the current file in the next segment toward the inside of the security placeholder, generally as shown in FIG. 2D. Although this will leave an empty space 108 between files 102 that were previously placed in the prior segment and placeholder 106, it will in most cases be possible to place the file in the next segment in this manner, unless the segment size is smaller than that required for placing a large file. The disadvantage of this approach is that it can waste available disc storage space, unless empty space 108 can at least be partially backfilled with another smaller file that will fit within the empty space. The alternative of backfilling empty space 108 is not shown in the flow chart, but that step is one alternative contemplated to improve the use of available space on the storage medium disc. After completing the steps of FIG. 10, the process places the next file (if any remain), generally as indicated in FIG. 9.

A further alternative embodiment represented by step 316' in FIG. 10 provides for moving the placeholder as far outwardly (i.e., towards files 102 in FIG. 2A) as possible within the limitations imposed by the predefined rules regarding disposition of the placeholder, and then placing the file in the next segment, inside of the placeholder just moved so that the current file abuts against the placeholder. Although this embodiment does not completely eliminate empty space 108, it does reduce the amount of empty space in the current segment that remains after placing the current file in the next segment, on the inside of the placeholder.

Yet a further alternative to decision step 310 is contemplated. In the event that the placeholder can be moved either in or out to make room for the current file (without violating the constraints imposed by the predefined rules), a decision step 310' provides for determining whether the movement of the placeholder inwardly or outwardly minimizes the empty space between the files previously placed and the placeholder if the placeholder is moved outwardly and the file is placed in the next segment, or between the file being placed and the placeholder, if the placeholder is moved inwardly and the file is placed in the current segment. Whichever direction provides the least amount of empty space in the current segment would then be selected for moving the placeholder—again in conformance with the predefined rules that determine the disposition of each placeholder. If the placeholder is thus determined to be moved outwardly, the logic proceeds to block 308 and conversely, if the placeholder is to be moved inwardly, the logic proceeds to block 314.

There are several limitations in the current preferred embodiment of the present invention. Because the software tool of the present invention automatically places folders and files based upon an ordering of the folders by breadth, it will be apparent that a desired ordering of the files and folders by the software tool on the memory medium may only approximate the desired order desired by a developer. Also, any files and folders that are too large to be fitted within either layer zero or layer one in any available space remaining in a segment will be left in the unplaced file storage and will need to be manually placed on the disc layout. Accordingly, the software tool gives the developer the option to manually place files and folders on the memory medium within segments and to modify the order achieved by the automated layout, as desired by the developer, but within the constraints imposed by the layout of the storage medium disc.

Since the automated positioning of files within the different segments may not be entirely to the liking of the user, the user can use a file management program such as Microsoft Corporation's WINDOWS™ EXPLORER™ to move files, copy files, rename files, and delete files within the staging area on the user's hard drive. If the software tool is running when the change is made with the operating system file managing program, the software tool will prompt the user with a notice that a change has been made to the staging area. If one or more files has changed size, but no new files have been added, the software tool will attempt to accommodate the changes in size within the automatic layout of the files on the storage medium, by shifting the disposition of files and folders in the segments without changing their order. If a file has been renamed using the file management software, the software tool will attempt to rename the file within the layout, but without changing the placement of the files on the storage medium disc. If one of more files are removed using the file management program (e.g., EXPLORER™), the software tool will remove those files from the layout of the files on the storage medium disc and attempt to shift all of the remaining files down (i.e., the files that are inwardly of the point where the file was removed) to fill in any gaps created by the removal. If files are added using the file management program, the software tool will attempt to add them to the disc layout automatically by again placing files within the segments, starting with the first file position that was added.

Finally, if the user moves a file, the software tool will attempt to accommodate the moved file within the layout by automatically moving other affected files. For example, if a user has files that were automatically placed on the disc in the order: a, b, c, d, e, f—where file "a", is closest to the outer edge of the disc, and the user decides to move file "c" to a position between files "e" and "f," the new ordering would appear as a, b, d, e, c, f Once the user has finished specifying the move of file "c" in this manner, the software tool will keep the layout for files "a" and "b" in the segment in which they were originally placed, but will remove all of the remaining files c, d, e, f and then reposition them in accord with the procedure described above using the current placeholder positions. The placeholder positions will only be modified if conflicts arise with the repositioning of the files on the segments, generally as described above. This process is reiterative as long as changes are made by the user to the collection of files.

Folder Tree View and Layout View

Figure 3:
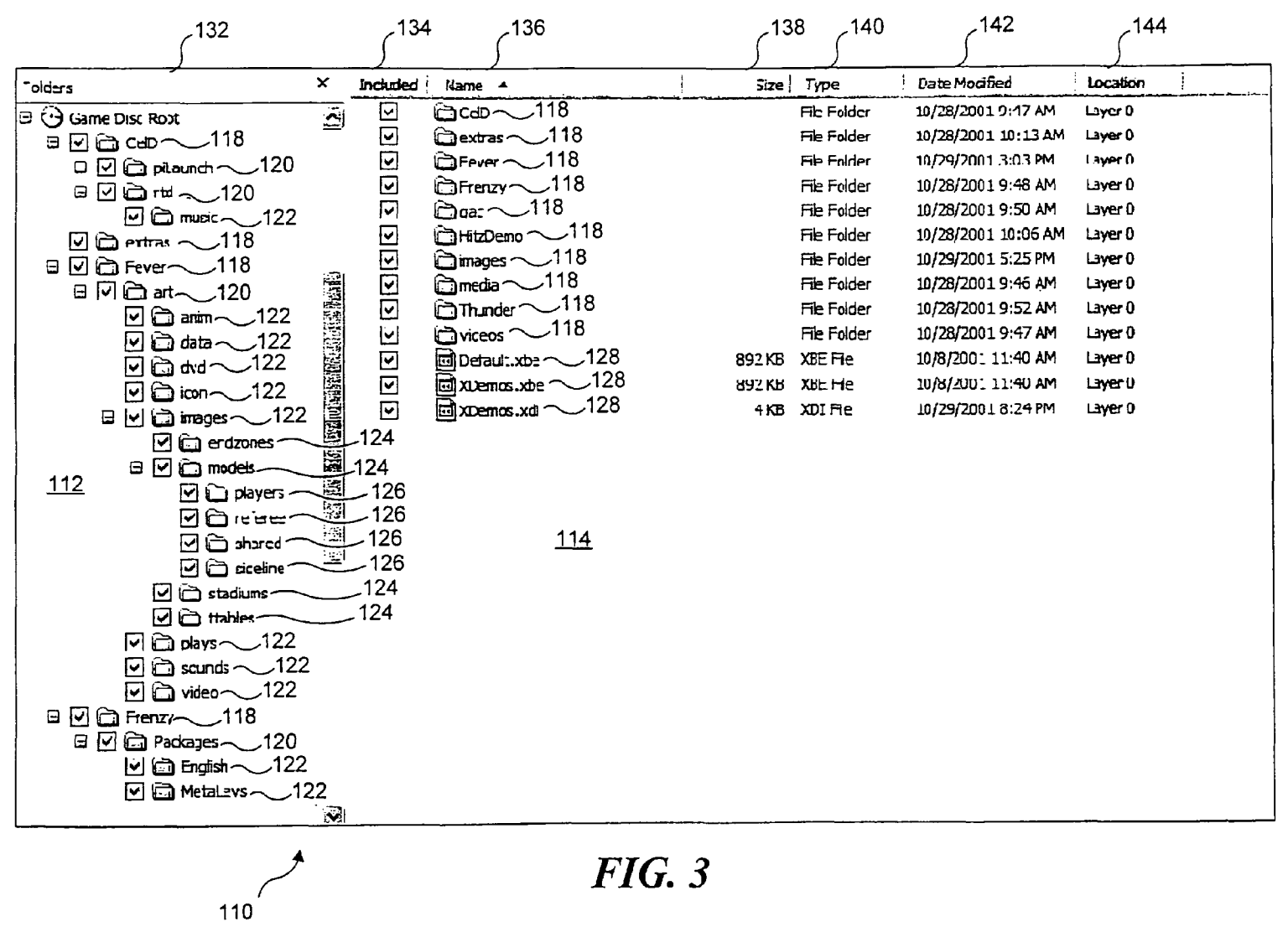

To facilitate creation of a collection of files in the staging area for use by the present invention in laying out the files and folders within the segments of a storage medium disc, the software tool provides two different views including a folder tree view, and a layout view. An exemplary folder tree view 110 is illustrated in FIG. 3. Folder tree view 110 includes a hierarchical folder tree window 112, and a details window 114. Column headings for this view include a folders column 132 for the hierarchical folder tree window, and include indicator column 134 in which each file (or folder) in a selected folder includes a mark to indicate whether it is included within the collection, a name column 136 in which folders and files are labeled, a size column 138 providing the byte size of each file, a type column 140, which indicates the type of file (or indicates a folder), a date modified column 142, and a location column 144, which indicates the layer in which the file or folder (included in the collection) is currently placed. Hierarchical folder window 112 displays the folder contents of the staging area. This view looks similar to folder tree views provided in WINDOWS™ EXLORER™, but does not permit the same functionality in terms of adding, deleting, renaming, or moving folders or files.

Figure 4A:
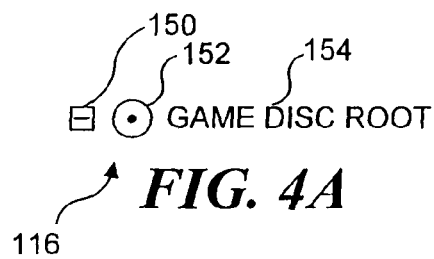
FIGS. 4A-4F illustrate different indications for folders and files in the folder tree view.

FIG. 4A illustrates an exemplary game disc root 116. The root of the staging area is shown as an expandable disc entitled Game Disc Root. Although in this example and in FIG. 3, the game disc root node is not excludable and does not have any check box to indicate whether it has been included or excluded from the collection, a newer embodiment of the present invention enables the game disc root node to be excluded. As shown in FIG. 4A, a subfolder indicator 150 includes a dash line to indicate that the game disc root includes subfolders and that the folder tree window shows the subfolders. A disc root identifier 152 is provided, as is a label 154. The subfolders one level below the game disc root are identified by reference numerals 118, and each of these subfolders includes an include check box 156; a check mark in check box 156 indicates that the subfolder is included within the collection that has been or will be laid out on the disc. A folder icon 158 identifies an entry as a subfolder, and each subfolder is provided with its own label 154. The newer embodiment would also provide a check box like check box 156 for game disc root 116.

Figure 4B:
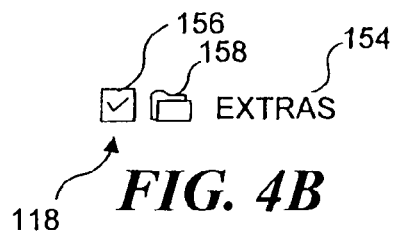
Figure 4C:
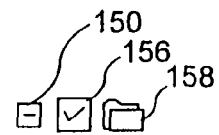
Figure 4D:
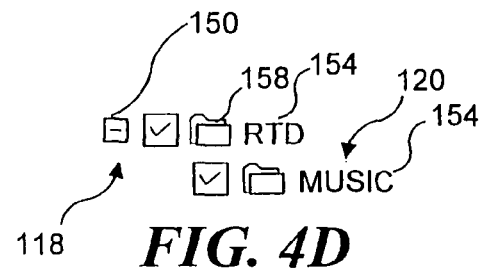
Figure 4E:
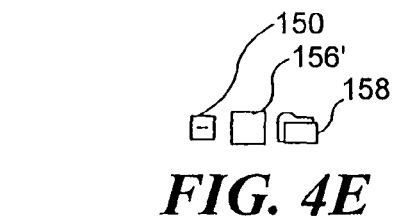
Figure 4F:
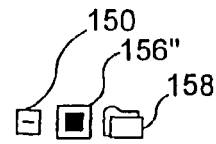

One of subfolder 118 that is exemplary of subfolders, which do not have any subfolders, is illustrated in FIG. 4B. FIG. 4C illustrates an example designating a subfolder having subfolders that are displayed in the folder tree window, and which is included in the collection. Below subfolders 118 is another level of subfolders 120, an example of which is shown in FIG. 4D. Similarly, below subfolders 120 is another level of subfolders 124, and below that level of subfolders, is yet another level of subfolders 126. FIG. 4E illustrates a subfolder having subfolders none of which are included within the collection, since a check box 156' is not checked. In FIG. 4F, a subfolder is shown that includes a mixture of included and excluded files and subfolders beneath the current folder; this status is indicated with the filled-square mark in a check box 156".

The folder tree structure of FIG. 3 makes clear how the present invention processes folders and files breadth first, when automatically placing folders and files in the segments of the storage medium disc. It should be apparent that the software tool will processes all of the files in the root directory, followed by all of subfolders 118, followed by all of subfolders 120, followed by all of subfolders 122, followed by all of subfolders 124, followed by all of subfolders 126, etc., so that each successive level of subfolders and the files contained therein is processed before the next lower level is processed. In the example shown, the game disc root includes three files 128, which would be placed first within the storage medium disc. Thereafter, folders 118 would be processed, so that all files within each of these folders would be placed successively within segments of the storage medium disc.

FIG. 6 illustrates the layout view of a disc that has been partially filled with files and folders by the software tool, in accord with the present invention. As noted above in regard to the initial empty format of the storage medium disc of FIG. 5, security placeholders 184 define segments 186. If no files have been placed therein, the segments are identified as being empty (this term is also used to designate a partially filled segment). Files 188 have been placed in the portion of the segment that is shown in FIG. 6, and their corresponding folder names 190 are listed in column 174. A folder 192 is included as a subfolder of the subfolder "media" In this embodiment, a first file within a subfolder is listed below the folder entry, but all other files within the folder are placed on the storage medium disc above the folder entry. The folder entry simply indicates the metadata for the folder. The reason that the first file within the folder precedes the folder name is to enable more rapid loading of the first file, which frequently will be an executable file. In this example, a subfolder 194 includes only two files as does a subfolder 196. Not shown is a subfolder for fonts, of which only two font files are shown at the very bottom of the Figure. The status line at the bottom of the layout view indicates that a total of 54 files have been placed on layer zero, and these 54 files occupy 9.23 MB of storage. Along the left edge of the layout view is a loading speed indicator 198, that is normally in color, extending from a dark green color at the lower left corner through a bright red color at the upper left corner to illustrate the relative speed with which the files laid out on the storage medium disc can be loaded into memory. For example, on a CAV type drive, the files that are placed near the outer edge of the disc will load more rapidly than those placed near the inside edge, so indicator 198 helps the user to visually perceive the relative speed with which the files that are displayed in the layout view are read for loading into memory, based upon their relative location between the inner and outer edges of the disc. The layout view thus provides a visual representation of the disposition of the files and folders on the storage medium disc in regard to the segments in which the files are placed. A user can employ the layout view in placing out files that were previously placed in the unplaced file storage.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. One or more computer readable media storing computer readable instructions that, when executed by a processing device, provide a tool for arranging storage for a plurality of folders and files on a storage medium disc according to a security format that employs a plurality of security placeholders to hinder unauthorized copying of the storage medium disc, the tool comprising:

a folder tree view display of folders that include the files to be laid out on the storage medium disc, the folder tree view display indicating each folder and each file in a collection of files selected by a user for storage on the storage medium disc;

an initial empty format view display corresponding to the security format showing that no files have been placed on the storage medium disc, the initial empty format view display indicating an initial disposition of the security placeholders on the storage medium disc that is determined automatically by applying predefined rules without interaction from the user, the initial disposition of the security placeholders on the storage medium disc defining empty segments of varying size for storing the collection of files selected by the user, wherein the initial empty format view does not enable the user to manually reposition security placeholders in the initial disposition of the security placeholders on the storage medium disc;

an automated folder and file placement module, which when activated, attempts to automatically place each folder and file in the collection of files selected by the user within segments defined by the initial disposition of the security placeholders on the storage medium disc and, if a folder or file to be placed will not fit within a current segment, to automatically move a security placeholder that is between the current segment and an adjacent empty segment without interaction from the user in order to fit the folder or file to be placed in one of the current segment and the adjacent empty segment, wherein automatic movement of the security placeholders by the automated folder and file placement module is constrained by the predefined rules that automatically determined the initial disposition of the security placeholders on the storage medium disc; and a layout view display corresponding to the security format showing placement of the folders and files in the collection of files selected by the user within segments defined by a new disposition of the security placeholders on the storage medium disc, a wherein the layout view display does not enable the user to manually reposition security placeholders in the new disposition of the security placeholders on the storage medium disc.

2. The one or more computer readable media of claim 1, wherein the storage medium disc comprises a plurality of layers, and wherein the layout view display selectively shows the folders and files in the collection of files selected by the user placed in at least one of:

a selected layer of the plurality of layers; and an unplaced files storage that contains any folders and files not yet placed on the storage medium disc.

3. The one or more computer readable media of claim 1, wherein the folder tree view display has a status section that indicates at least one of:

one of a current selected file and a current selected folder; and a size of any current selected file or any current selected folder.

4. The one or more computer readable media of claim 1, wherein:

the folder tree view display shows contents of a staging area that enables the user to manually change file position in the collection of files; and in response to the user making a manual change in file position in the collection of files within the staging area, the folders and files in the collection of files are automatically repositioned in the layout view display within the segments defined by the new disposition of the security placeholders on the storage medium disc.

5. The one or more computer readable media of claim 1, the tool further comprising;

a grouping option that enables selected adjacent files to be grouped together to produce a grouped set of files; and an ungrouping option that enables a selected grouped set of files to be ungrouped, wherein a grouped set of files can be automatically repositioned within segments defined by the new disposition of the security placeholders on the storage medium disc like a single file.

6. The one or more computer readable media of claim 1, the tool further comprising;

an option for pre-mastering the security format showing the collection of files within the segments defined by the new disposition of the security placeholders to a format that is to be used for producing a layout of the collection of files on a master storage medium disc.

7. A method for automatically arranging files on a storage medium disc according to a security format that employs a plurality of security placeholders to hinder unauthorized copying of the storage medium disc, the method comprising:

enabling a user to designate a collection of files that are to be transferred to the storage medium disc;

displaying, on a computer, an initial empty format view corresponding to the security format showing that no files have been placed on the storage medium disc, the initial empty format view indicating an initial disposition of the security placeholders on the storage medium disc that is determined automatically by applying predefined rules without interaction from the user, the initial disposition of the security placeholders on the storage medium disc defining empty segments of varying size for storing the collection of files, wherein the initial empty format view does not enable the user to manually reposition security placeholders in the initial disposition of the security placeholders on the storage medium disc;

attempting to automatically place files from the collection of files within segments defined by the initial disposition of the security placeholders on the storage medium disc;

if a file to be placed will not fit within a current segment, automatically moving a security placeholder that is between the current segment and an adjacent empty segment without interaction from the user in order to fit the file to be placed in one of the current segment and the adjacent empty segment, wherein automatic movement of the security placeholder is constrained by the predefined rules that automatically determined the initial disposition of the security placeholders on the storage medium disc; and displaying a layout view showing placement of files in the collection of files within segments defined by a new disposition of the security placeholders on the storage medium disc, wherein the layout view does not enable the user to manually reposition security placeholders in the new disposition security placeholders on the storage medium disc.

8. The method of claim 7, wherein automatically moving the security placeholder comprises at least one of:

moving the security placeholder against a previously placed file in the current segment and placing the file to be placed in the adjacent empty segment; and moving the security placeholder so as to increase available space within the current segment and decrease available space within the adjacent empty segment.

9. The method of claim 7, wherein the initial disposition of the security placeholders on the storage medium disc is automatically determined in a pseudo-random manner.

10. The method of claim 7, further comprising:

back filling unfilled space in a segment to accommodate a file to be placed after another file has been placed in a successive segment that is after the segment being back filled.

11. The method of claim 7, wherein the collection of files comprises at least one folder, the method further comprising:

showing placement of each folder of the collection of files in segments defined by the new disposition of the security placeholders on the storage medium disc in the layout view.

12. The method of claim 7, wherein automatically moving the security placeholder minimizes at least one of:
   an amount of movement of the placeholder; and
   empty space in the current segment.

13. The method of claim 7, further comprising at least one of:
   placing files within successive segments sequentially, starting from a radially outermost segment of the storage medium disc and filling successive segments inwardly; and
   placing files in segments on successive layers of the storage medium disc.

14. The method of claim 7, further comprising:
   enabling a user to manually change file position within the segments defined by the new disposition of the security placeholder on the storage medium disc.

15. The method of claim 14, further comprising:
   shifting positions of files on the storage medium disc that are disposed sequentially after any file position manually changed by the user.

16. The method of claim 7, further comprising:
   displaying a folder tree view indicating a folder hierarchy for the collection of files; and
   enabling the user to designate each file to be included in the collection of files to be laid out on the storage medium disc using the folder tree view.

17. The method of claim 7, further comprising at least one of:
   placing any file that cannot be automatically placed into an unplaced file storage and enabling the user to manually place the file into one of the segments defined by the new disposition of the security placeholder on the storage medium disc; and
   removing a file from a segment defined by the new disposition of the security placeholder on the storage medium disc and shifting all files after the file that was removed to fill available space created by removal of the file.

18. The method of claim 7, further comprising:
   enabling the user to determine a preferred order in which to automatically place the files in the collection of files on the storage medium disc.

19. A system for automatically arranging files for storage on a storage medium disc according to a security format that employs a plurality of security placeholders to hinder unauthorized copying of the storage medium disc, the system comprising:
   a memory in which a plurality of machine instructions are stored;
   a display;
   a user input device; and
   a processor that is coupled to the memory, the display, and the user input device, said processor executing the machine instructions stored in the memory to carry out a plurality of functions, including:
   enabling a user to employ the user input device to select a collection of to be laid out on the storage medium disc;
   displaying, on the display, an initial empty format view corresponding to the security format showing that no files have been placed on the storage medium disc, the initial empty format view indicating an initial disposition of the security placeholders on the storage medium disc that is determined automatically by applying predefined rules without interaction from the user, the initial disposition of the security placeholders on the storage medium disc defining empty segments of varying size for storing the collection of files, wherein the initial empty format view does not enable the user to manually reposition security placeholders in the initial disposition of the security placeholders on the storage medium disc;
   attempting to automatically place files from the collection of files within segments defined by the initial disposition of the security placeholders on the storage medium disc;
   if a file to be placed will not fit within a current segment, automatically moving a security placeholder that is between the current segment and an adjacent empty segment without interaction from the user in order to fit the file to be placed in one of the current segment and the adjacent empty segment, wherein automatic movement of the security placeholder is constrained by the predefined rules that automatically determined the initial disposition of the security placeholders on the storage medium disc storage medium disc; and
   displaying a layout view showing placement of files in the collection of files within segments defined by a new disposition of the security placeholders on the storage medium disc, wherein the layout view does not enable the user to manually reposition security placeholders in the new disposition of the security placeholders on the storage medium disc.

* * * * *